(12) United States Patent
Lin

(10) Patent No.: US 8,284,078 B2
(45) Date of Patent: Oct. 9, 2012

(54) CONTROL METHOD AND CONTROL SYSTEM

(75) Inventor: Chih-Hao Lin, Taipei Hsien (TW)

(73) Assignee: Giga-Byte Technology Co., Ltd., New Taipei (TW)

(*) Notice: Subject to any disclaimer, the term of this patent is extended or adjusted under 35 U.S.C. 154(b) by 503 days.

(21) Appl. No.: 12/614,438

(22) Filed: Nov. 8, 2009

(65) Prior Publication Data

US 2011/0109483 A1 May 12, 2011

(51) Int. Cl.
*H03M 11/00* (2006.01)
(52) U.S. Cl. ............... 341/22; 341/23; 341/26; 400/485; 400/490; 400/486; 400/489; 400/98
(58) Field of Classification Search .................. 341/22, 341/26; 400/485, 490, 486, 489, 98
See application file for complete search history.

(56) References Cited

U.S. PATENT DOCUMENTS

| | | | | |
|---|---|---|---|---|
| 6,198,474 B1* | 3/2001 | Roylance | ...... | 345/168 |
| 6,231,252 B1* | 5/2001 | Kitamura | ...... | 400/484 |
| 6,320,519 B1* | 11/2001 | Hsu et al. | ...... | 341/23 |
| 6,574,517 B1* | 6/2003 | Park et al. | ...... | 700/84 |
| 6,970,158 B2* | 11/2005 | Emerson | ...... | 345/168 |
| 6,979,140 B2* | 12/2005 | McLoone et al. | ...... | 400/486 |
| 7,015,898 B2* | 3/2006 | Wang | ...... | 345/168 |
| 7,029,191 B2* | 4/2006 | Wang | ...... | 400/486 |
| 7,345,598 B2* | 3/2008 | Li | ...... | 341/22 |
| 8,081,090 B2* | 12/2011 | Wu et al. | ...... | 341/22 |
| 2008/0204282 A1* | 8/2008 | Jeon | ...... | 341/22 |
| 2009/0153372 A1* | 6/2009 | Wu et al. | ...... | 341/22 |

* cited by examiner

*Primary Examiner* — Linh Nguyen
(74) *Attorney, Agent, or Firm* — Chun-Ming Shih

(57) ABSTRACT

An exemplary control method includes the following steps. Judging if a hot key is pressed. Updating a data in a data field when the hot key is pressed. Judging if a first function key is pressed. When the first function key is pressed, outputting a first key code according to the data in the data field and the first function key. Executing a first service process according to the first key code. A control system is also disclosed.

14 Claims, 4 Drawing Sheets

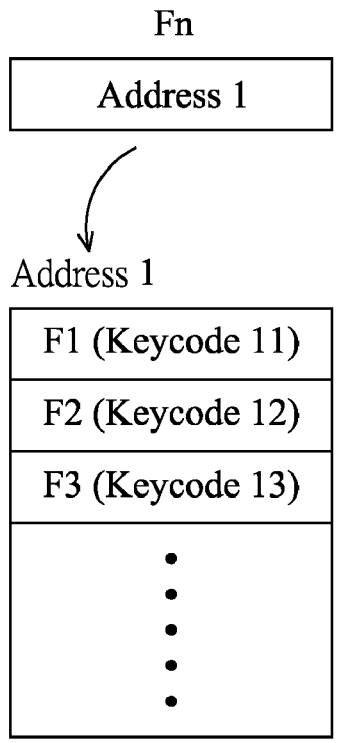
FIG. 3A
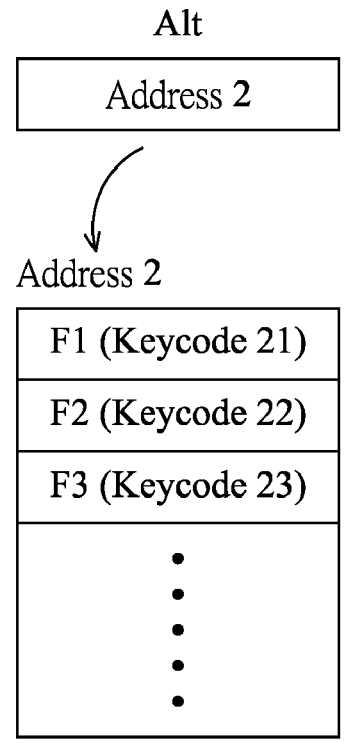
FIG. 3B
| 0xA1 | Fn+F1 (Keycode 11) |
| 0xA2 | Fn+F2 (Keycode 12) |
|  | ⋮ |
| 0xB1 | Alt+F1 (Keycode 21) |
| 0xB2 | Alt+F2 (Keycode 22) |
|  | ⋮ |
FIG. 3C

CONTROL METHOD AND CONTROL SYSTEM

BACKGROUND

1. Field of the Invention

The present invention generally relates to control systems, and more particularly to a control system of a hot key with a function combination.

2. Description of Prior Art

Nowadays, a computer becomes to be a necessary tool for our works or daily lives. Take an operation system as an example, the human-computer interface of an early DOS system is not friendly, because for beginners, it's too difficult to cross the access threshold. When windows system is published, the access threshold and confusion are eliminated. Generally, a use operates the windows system with a mouse. However, if operate the windows system according to an original process, work efficiency may be affected. For example, in windows system, when a user uses the mouse to adjust some functions such as speaker volume and screen brightness, many windows need to be opened before the function is adjusted.

BRIEF SUMMARY

One objective of the present invention is to provide a control method of a hot key with a function combination.

A control method comprises the following steps. Judging if a hot key is pressed. Updating a data in a data field when the hot key is pressed. Judging if a first function key is pressed. When the first function key is pressed, outputting a first key code according to the data in the data field and the first function key. Executing a first service process according to the first key code.

According to the control method, the first key code is output by a control unit, a terminal unit executes the first service process according to the first key code, and the terminal unit sends an interrupt command, a processing system executes the first service in the interrupt period.

According to the control method, the interrupt command is a system control interrupt or a system management interrupt.

According to the control method, when the first function key is pressed, the hot key is also pressed.

According to the control method, the hot key is released when the first function key is pressed.

The control method further comprises steps of judging if a reset function is activated; if the reset function is inactivated, when the first function key is pressed, judging if a second function key is pressed; if the second function key is pressed, outputting a second key code according to the data in the data field and the second function key; executing a second service process according to the second key code; and if the reset function is activated, when the second function key is pressed after the first function key is pressed, the second service process is not executed.

According to the control method, the data in the data field represents the times that the hot key has been pressed.

Another objective of the present invention is to provide a control system for a hot key with a function combination.

A control system, comprises a keyboard, a control unit, a terminal unit and a processing unit. The keyboard includes a hot key and a first function key. When the hot key is pressed, the keyboard outputs a hot key scan signal, when the first function key is pressed, the keyboard outputs a first function key scan signal. The control unit updates a data in a data field when the keyboard outputs the hot key scan signal, and when the keyboard outputs the first function key scan signal after the hot key scan signal is received, the control unit outputs a key code according to the data in the data field and the first function key scan signal. The terminal unit generates an interrupt command when receiving the key code. The processing system obtains the interrupt command, the processing system executes a service process according to the key code.

According to the control system, the control unit is a keyboard controller or an embedded controller.

According to the control system, the terminal unit includes a south-bridge chip used for generating the interrupt command. The interrupt command is a system control interrupt or a system management interrupt.

According to the control system, when the hot key is pressed and hold, if the first function key is pressed, the keyboard still outputs the first function scan signal.

According to the control system, the hot key is released when the first function key is pressed.

According to the control system, if a reset function is inactivated, after the hot key and the first function key are both pressed, and if a second function key is pressed, the keyboard outputs a second function key scan signal, the control unit outputs a second key code according to the data field and the second function key scan signal, and the processing unit executes a second service process according to the second key code.

According to the control system, if a reset function is activated, when the second function key is pressed after the first function key and the hot key are pressed, the keyboard outputs a second function key scan signal, and the control unit outputs a second key code according to the second function key code.

According to the control system, the data in the data field represents the times that the hot key has been pressed.

BRIEF DESCRIPTION OF THE DRAWINGS

These and other features and advantages of the various embodiments disclosed herein will be better understood with respect to the following description and drawings, in which like numbers refer to like parts throughout, and in which:

FIGS. 3A and 3B show an exemplary embodiment of a controller obtaining a key code;

FIG. 3C shows another exemplary embodiment of a controller obtaining a key code;

DETAILED DESCRIPTION

When a user presses at least one hot key and at least one function key, a service process corresponding to the pressed hot key and function key can be activated. Thus, operation time is saved.

Figure 1:
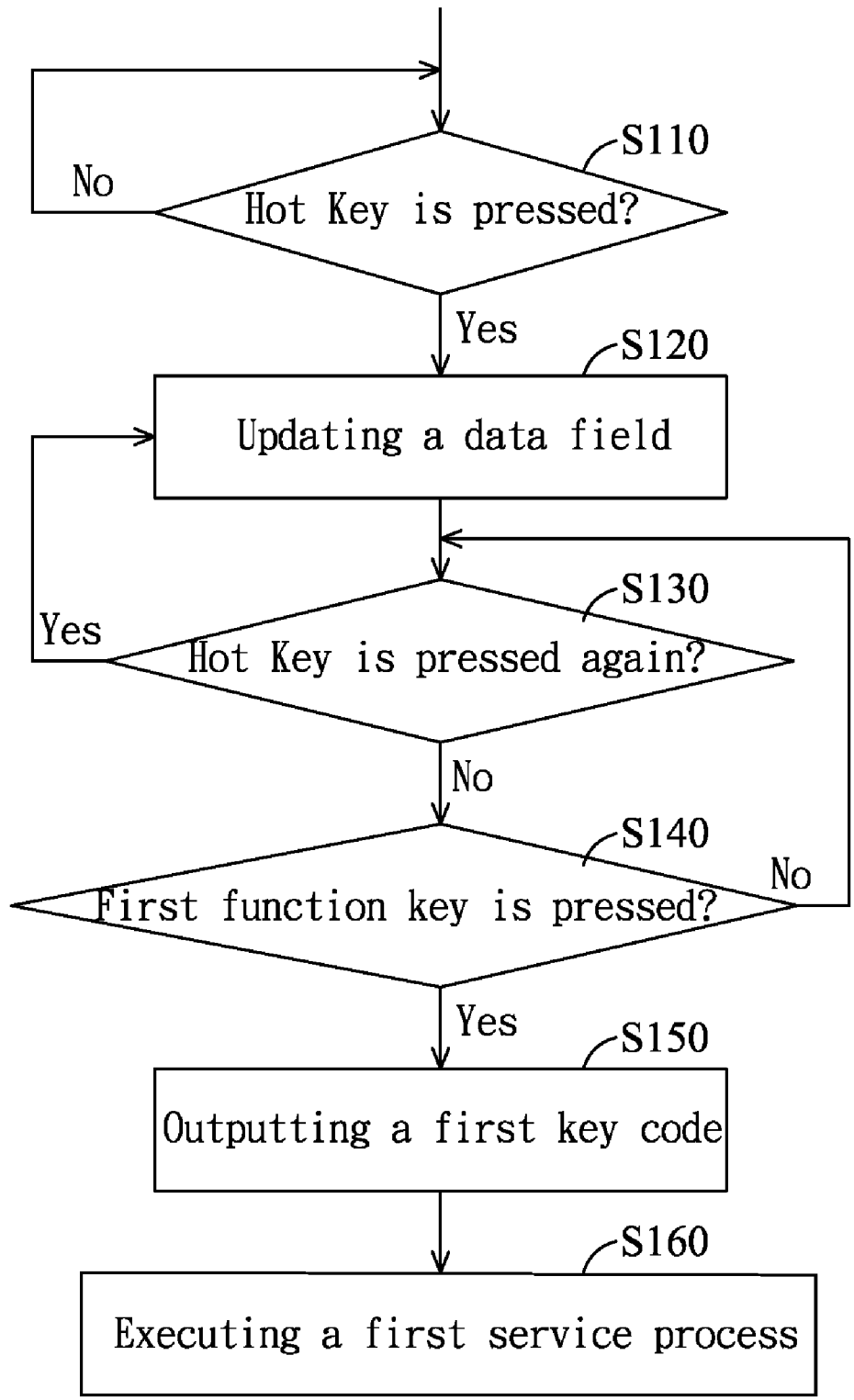
FIG. 1 shows a control method in accordance with an exemplary embodiment of the invention.

FIG. 1 shows a control method in accordance with an exemplary embodiment of the invention. First, in step S110, judge if a hot key should be pressed. In the embodiment, the hot key includes the keys such as Alt, Ctrl, Fn, Shift, and so on. When one of the keys is pressed singly, there is no response and nothing is triggered.

Generally, when one key on the keyboard is pressed, the keyboard should output a corresponding scan signal. In the embodiment, a controller receives the scan signal from the keyboard, and judges which key is pressed according to the scan signal provided by the controller. In another embodiment, the controller is a keyboard controller (KBC) or an embedded controller (EC).

In step S120, when a hot key is pressed, a data in a data field is updated. In the embodiment, when the controller receives a hot key scan signal from the keyboard, controller updates the data in a data field. An exemplary original data of the data field is 0.

Go to step S130, judge if the hot key should be pressed again. If the hot key is pressed again, return to step S120, update the data of the data field again. In the embodiment, the data in the data field represents the times that the hot key has been pressed. In the invention, the pressed times of the hot key is not limited. Different times of the hot key has been pressed should cause different response. In another embodiment, step 130 can be omitted.

Go to step S140, judge if a first function key should be pressed. The type of the first function key is not limited in the invention. In the embodiment, the function key represents the keys that when being pressed singly, there is response and a function is triggered. For example, the function key can be number keys, letter keys, or the keys through F1 to F12. In another embodiment, the user can choose press or release the hot key according to his/her habit. Therefore, when the first function key is pressed, the hot key may be pressed or released.

When the first function key is not pressed, return to step S130. When the first function key has been pressed, go to step S150, a first key code is output according to the data in the data field and the command represented by the first function. In the embodiment, the controller (e.g, KBC or EC) that receives the scan signal from the keyboard may output a first key code after both the hot key and the first function key are pressed. However, the controller should not output any key code, when only the scan signal of the hot key is received. The controller can output the first key code until the function keys is pressed completely. Of course, it is not always only one function key is pressed.

In one feasible embodiment, take an example, the user want to activate a first service process, and the combination keys corresponding to the first service process are a hot key Fn and a function key F1, the controller may output the key code corresponding to the first service process after the hot key Fn and the function key F1 are both pressed.

In addition, take another example, if the combination keys corresponding to the first service process are a hot key Fn and two function keys (number keys 1 and 2), the controller may output the key code corresponding to the first service process after the hot key Fn and the two function keys (number keys 1 and 2) are all pressed.

Go to step 160, a first service process is executed according to the first key code. In the embodiment, when the controller output the first key code, a terminal unit (e.g, a south-bridge chip) executes the first service process according to the first key code. In one feasible embodiment, the terminal unit sends an interrupt command to interrupt a currently executed process. In the interrupt period, a processing system executes the first service process. The interrupted process should continue when the first service process is completed.

The type of the interrupt command is not limited in the invention. In some feasible embodiments, the interrupt command sent by the terminal unit can be system control interrupt (SCI), system management interrupt or interrupt request (IRQ).

Figure 2:
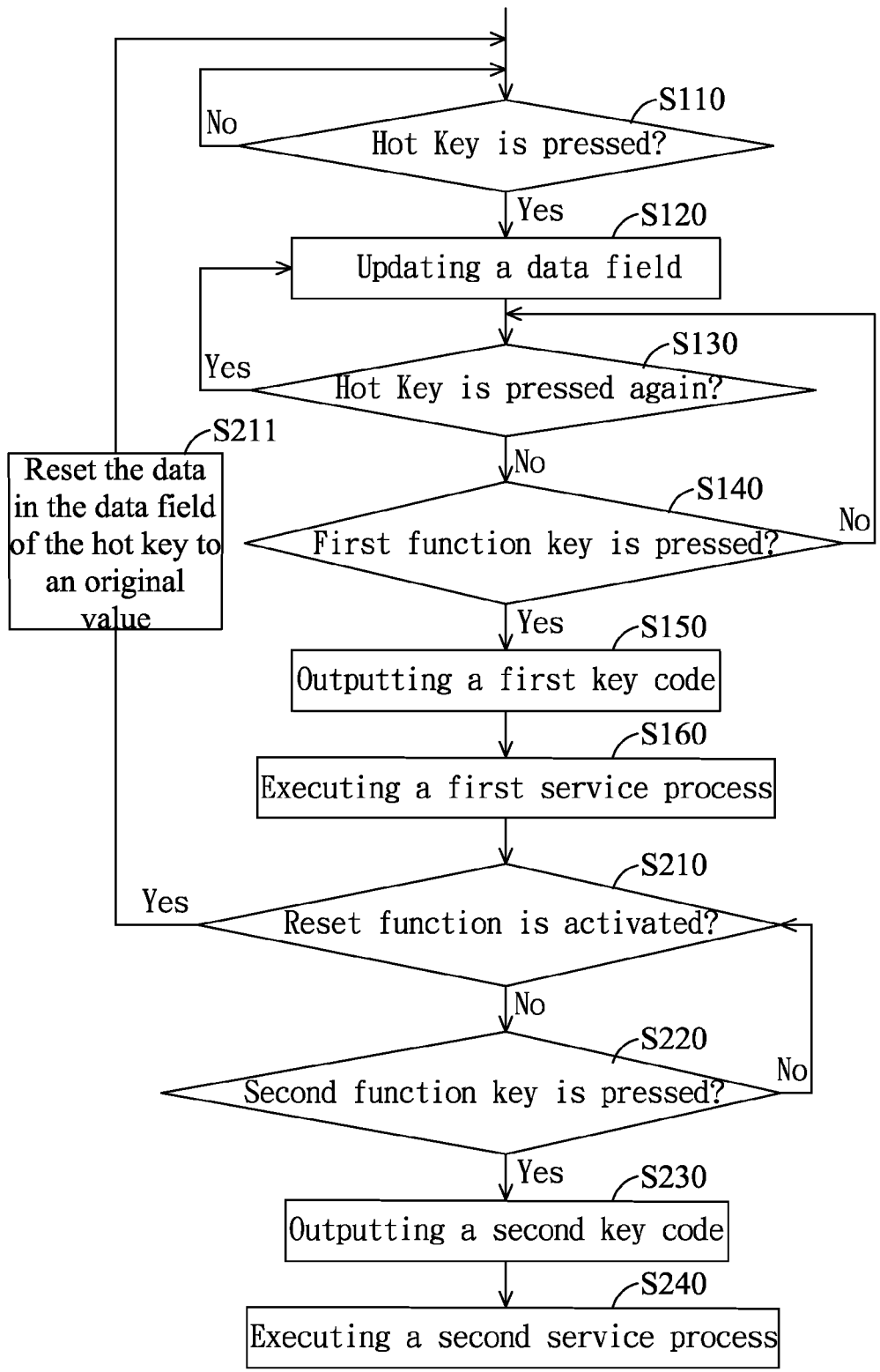
FIG. 2 shows a control method according to another exemplary embodiment of the invention.

FIG. 2 shows a control method in accordance with another exemplary embodiment of the invention. Compared with FIG. 1, FIG. 2 has additional steps S210-S240. The steps S110-S160 shown in FIG. 2 are same with the steps S110-S160 shown in FIG. 1, which have been introduced above. In step S210, judge if a reset function is activated. If the reset function is activated, go to step S211, reset the data in the data field of the hot key to be the original value, and then go to step S110.

The user can decide that whether the reset function be activated or not. In a feasible embodiment, the user can decide if activate the reset function in the function options of BIOS. If the reset function is not activated, go to step S220, judge that if a second function key should be pressed. The second function key can be a number key, a letter key or the key through F1 to F12.

If the second function key is not pressed, return to step 210. When the second function key is pressed, go to step S230, a second key code is output according to the data in the data field and the second function key.

In the embodiment, the reset function is inactivated, thus, the data in the data field is saved, and the controller can output the second key code according to the data in the data field and the pressed second function key.

Take an example, when the reset function is inactivated, if the user presses the hot key Fn and function keys F1 and F2, the controller can output two key codes, wherein one key code corresponds to the hot key Fn and the function key F1, that is, Fn+F1; the other key code corresponds to the hot key Fn and the function key F2, that is, Fn+F2. According to the two key codes, the processing system executes two service processes, such as adjusting screen brightness or adjusting the speaker volume. Therefore, in this embodiment, the user can obtain a required result without pressing the hot key again.

If the reset function is activated, when the user presses the hot key Fn and function keys F1, F2, controller only output one key code corresponding to Fn+F1. Thus, the processing system executes only one service process. To the pressed function F2, the processing system may execute the function of the single function key F2, such as save, reset, and so on.

FIGS. 3A and 3B show an exemplary feasible embodiment of a controller obtaining a key code. Referring to FIG. 3A, when the hot key Fn is pressed, the process should skip to address 1. Next, when the function key F1 is pressed, the controller can obtain that the combination of the hot key Fn and the function key F1 corresponds to a key code of keycode 11. Similarly, when the hot key Fn is pressed, if the function key F2 is also pressed, the controller can obtain that the combination of the hot key Fn and the function key F2 corresponds to a key code of keycode 12. In addition, the other key combinations go on like this.

FIG. 3B shows the relationship of the combination of the hot key Alt and function keys. When the hot key Alt is pressed, the process should skip to address 2. Next, when the function key F2 is pressed, the controller can obtain that the combination of the hot key Alt and the function key F2 corresponds to a key code of keycode 22.

FIG. 3C shows another feasible embodiment of a controller obtaining a key code. When the hot key Fn and the function key F1 are pressed in order, the process skips to address 0xA1, thus, the key code of keycode 12 is obtained. Similarly, when the hot key Alt and the function key F1 are pressed in order, the process skips to address 0xB1, thus, the key code of keycode 21 is obtained.

From FIGS. 3A to 3C, the process can search a corresponding key code in a key code table shown in FIG. 3C after the hot key and the function both are pressed; the process also can search a corresponding key code table shown in FIGS. 3A and 3B when the hot key is pressed.

Figure 4:
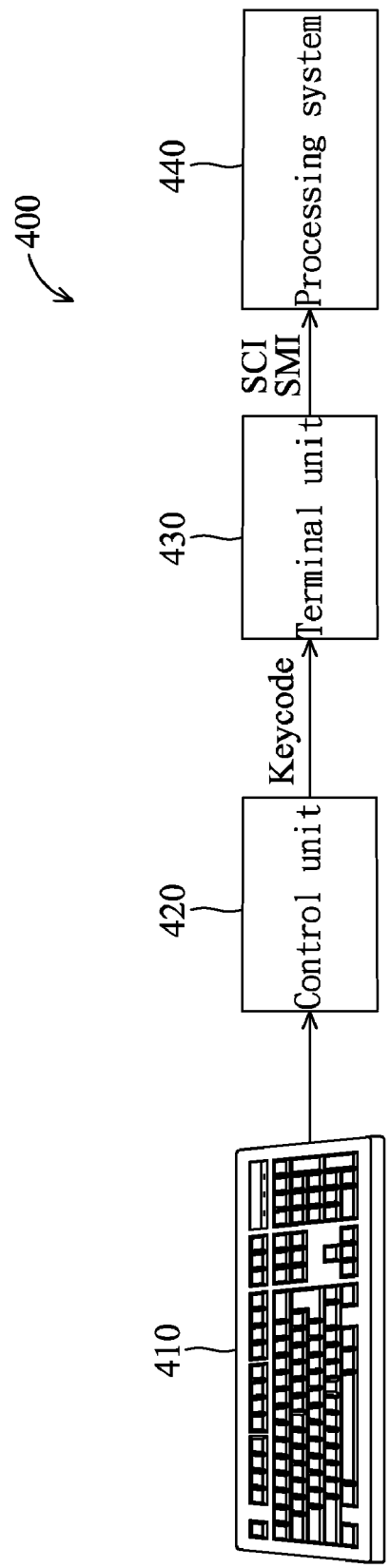
FIG. 4 is a schematic view of a control system in accordance with an exemplary embodiment of present invention.

FIG. 4 shows a schematic view of a control system of an embodiment. The control system 400 includes a keyboard 410, a control unit 420, a terminal unit 430 and a processing system 440. The keyboard 410 includes a hot key and a first function key. When the hot key is pressed, the keyboard 410 outputs a hot key scan signal to the control unit 420. When the first function key is pressed, the keyboard 410 outputs a first function key scan signal to the control unit 420.

The type of the hot key and the function key is not limited in the invention. In the embodiment, the hot key includes keys that when pressed singly, there is no response and nothing is triggered. Reversely, the function key represents the keys that when being pressed singly, there is response and a function is triggered, such as numbers or letters appear on the screen.

For example, the hot key can be on of the keys including Alt, Ctrl, Fn, Shift, and so on. The function key can be number keys, letter keys, or the keys through F1 to F12. In addition, it is not limited that if the hot key need to be released, when the function key is pressed. The user can select to press and hold the hot key or release the hot key, according to hie/her habit or for convenience. Thus, when the function key is pressed, the hot key may be in a pressed state or a released state.

In a feasible embodiment, if the hot key is pressed and hold, when the first function key is pressed, the keyboard 410 still can output a first function key scan signal. In another feasible embodiment, when the first function key is pressed, the hot key has been released.

The control unit 420 obtains the type of the pressed keys according to the signal output from the keyboard 410. The control unit 420 is a keyboard controller or an embedded controller.

When the keyboard 410 outputs a hot key scan signal, the control unit 420 updates the data in the data field corresponding to the hot key scan signal. The number of the data field in the invention is not limited. Different hot key scan signals corresponding to different data fields. In the embodiment, the data in the data field represents the times that the hot key has been pressed. And, the original data in the data field can be 0 or the other value.

After received the hot key scan signal, if the keyboard 410 outputs a first function key scan signal, the control unit 420 outputs a key code according to the data in the data field and the first function key scan signal. The method of control unit 420 for searching a key code can be in accordance with the method shown in FIGS. 3A to 3C.

Further, if a reset function is inactivated, when the hot key and the first function key are pressed, and if a second function key is also pressed, the keyboard 410 may output a second function key scan signal. The control unit 420 may output a first and second function key code (such as keycode 11 and keycode 22) according to the data in the data field, the first and second function key scan signals.

Reversely, if the reset function is activated, when the hot key and the first function key are pressed, and if a second function key is also pressed, the keyboard 410 also outputs a second function key scan signal. However, the control unit 420 outputs only a first function key code (such as keycode 11) according to the data in the data field and the first function key scan signal. For the second function key scan signal, the control unit 420 should not combine the hot key scan signal and the second function scan signal.

When the terminal unit 430 receives the key code, it sends an interrupt command (e.g, SCI or SMI) to interrupt a currently executed process. In the interrupt period, the processing system 440 executes a service process (e.g. increase/decrease screen brightness, or increase/reduce speaker volume) according to the received key code. In the embodiment, the terminal unit 430 includes a south-bridge chip. The south-bridge chip (not shown) generates an interrupt command SCI, SMI or IRP.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A control method, comprising the following steps:
   judging if a hot key is pressed;
   updating a data in a data field, when the hot key is pressed;
   judging if a first function key is pressed;
   when the first function key is pressed, outputting a first key code according to the data in the data field and the first function key, wherein the first key code is output by a control unit; and
   executing a first service process according to the first key code by a terminal unit, and the terminal unit sending an interrupt command, a processing system executing the first service in an interrupt period.

2. The control method as claimed in claim 1, wherein the interrupt command is a system control interrupt or a system management interrupt.

3. The control method as claimed in claim 1, when the first function key is pressed, the hot key is also pressed.

4. The control method as claimed in claim 1, wherein the hot key is released when the first function key is pressed.

5. The control method as claimed in claim 1, further comprising steps of:
   judging if a reset function is activated;
   if the reset function is inactivated, when the first function key is pressed, judging if a second function key is pressed;
   if the second function key is pressed, outputting a second key code according to the data in the data field and the second function key;
   executing a second service process according to the second key code; and
   if the reset function is activated, when the second function key is pressed after the first function key is pressed, the second service process is not executed.

6. The control method as claimed in claim 1, wherein the data in the data field represents the times that the hot key has been pressed.

7. A control system, comprising:
   a keyboard including a hot key and a first function key, when the hot key is pressed, the keyboard outputting a hot key scan signal, when the first function key is pressed, the keyboard outputting a first function key scan signal;
   a control unit updating a data in a data field when the keyboard outputting the hot key scan signal, and when the keyboard outputting the first function key scan signal after the hot key scan signal being received, the control unit outputting a key code according to the data in the data field and the first function key scan signal; and
   a terminal unit generating an interrupt command when receiving the key code;

when a processing system obtains the interrupt command, the processing system executing a service process according to the key code.

8. The control system as claimed in claim 7, wherein the control unit is a keyboard controller or an embedded controller.

9. The control system as claimed in claim 7, wherein the terminal unit includes a south-bridge chip, the south-bridge chip generating the interrupt command, the interrupt command being a system control interrupt or a system management interrupt.

10. The control system as claimed in claim 7, when the hot key is pressed and hold, if the first function key is pressed, the keyboard still outputting the first function scan signal.

11. The control system as claimed in claim 7, wherein the hot key is released when the first function key is pressed.

12. The control system as claimed in claim 7, wherein if a reset function is inactivated, after the hot key and the first function key are both pressed, and if a second function key is pressed, the keyboard outputting a second function key scan signal; the control unit outputting a second key code according to the data field and the second function key scan signal; the processing unit executing a second service process according to the second key code.

13. The control system as claimed in claim 7, wherein if a reset function is activated, when the second function key is pressed after the first function key and the hot key are pressed, the keyboard outputting a second function key scan signal; the control unit outputting a second key code according to the second function key code.

14. The control system as claimed in claim 7, wherein the data in the data field represents the times that the hot key has been pressed.

* * * * *